(12) United States Patent
Keefe et al.

(10) Patent No.: US 11,124,025 B2
(45) Date of Patent: Sep. 21, 2021

(54) TIRE TREAD

(71) Applicant: COMPAGNIE GENERALE DES ETABLISSEMENTS MICHELIN, Clermont-Ferrand (FR)

(72) Inventors: Brian Keefe, Clermont-Ferrand (FR); Walid Djabour, Clermont-Ferrand (FR); Arnaud Larregain, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 382 days.

(21) Appl. No.: 16/089,798

(22) PCT Filed: Apr. 5, 2017

(86) PCT No.: PCT/FR2017/050798
§ 371 (c)(1),
(2) Date: Sep. 28, 2018

(87) PCT Pub. No.: WO2017/174926
PCT Pub. Date: Oct. 12, 2017

(65) Prior Publication Data
US 2020/0164694 A1    May 28, 2020

(30) Foreign Application Priority Data

Apr. 8, 2016 (FR) ...................................... 1653114

(51) Int. Cl.
*B60C 11/13* (2006.01)
*B60C 11/03* (2006.01)
*B60C 11/04* (2006.01)

(52) U.S. Cl.
CPC .......... *B60C 11/13* (2013.01); *B60C 11/0323* (2013.01); *B60C 11/042* (2013.01); *B60C 2011/0355* (2013.01); *B60C 2200/06* (2013.01)

(58) Field of Classification Search
CPC ............... B60C 11/0323; B60C 11/125; B60C 11/1281; B60C 11/1307; B60C 11/1315; B60C 2011/133; B60C 2011/1338
See application file for complete search history.

(56) References Cited

U.S. PATENT DOCUMENTS

| | | | |
|---|---|---|---|
| 8,640,751 B2 * | 2/2014 | Ohashi | ................... B60C 11/12 152/209.18 |
| 2003/0201048 A1 * | 10/2003 | Radulescu | ......... B29D 30/0606 152/209.25 |

(Continued)

FOREIGN PATENT DOCUMENTS

| | | | |
|---|---|---|---|
| CN | 102548777 | | 7/2012 |
| DE | 102009044829 | * | 6/2011 |

(Continued)

OTHER PUBLICATIONS

English machine translation of JP02-241806. (Year: 1990).*
English machine translation of JP2001-294023. (Year: 2001).*

*Primary Examiner* — Robert C Dye
(74) *Attorney, Agent, or Firm* — Cozen O'Connor

(57) ABSTRACT

A groove of tire thread having a plurality of first and second portions, each delimited by facing walls spaced apart by a maximum width measured at the tread surface and approaching one another such that, at a depth between 20 and 80% of the total depth they are spaced apart by a width less than the maximum width or facing walls spaced apart by a minimum width measured at the tread and diverge from one another such that, at a depth between 20% and 80% of the total depth of the groove, they are spaced apart from one another by a width greater than the width. A plurality of first (Continued)

and second portions of groove so as to form a continuous passage between all the portions of groove in order to allow liquid to flow in the groove regardless of the level of wear.

10 Claims, 1 Drawing Sheet

(56) References Cited

U.S. PATENT DOCUMENTS

| | | | |
|---|---|---|---|
| 2011/0168310 A1* | 7/2011 | Fabing | B60C 11/16 152/209.18 |
| 2012/0227883 A1* | 9/2012 | Audigier | B60C 11/0323 152/209.18 |

FOREIGN PATENT DOCUMENTS

| | | |
|---|---|---|
| EP | 0 206 227 | 12/1986 |
| EP | 1 341 679 | 9/2003 |
| FR | 3 014 747 | 6/2015 |
| JP | 02-241806 * | 9/1990 |
| JP | 2001-294023 * | 10/2001 |
| WO | WO 02/38399 | 5/2002 |
| WO | WO 2011/039194 | 4/2011 |
| WO | WO 2015/082310 | 6/2015 |
| WO | WO 2015/086624 | 6/2015 |
| WO | WO 2015/150282 A2 | 10/2015 |

* cited by examiner

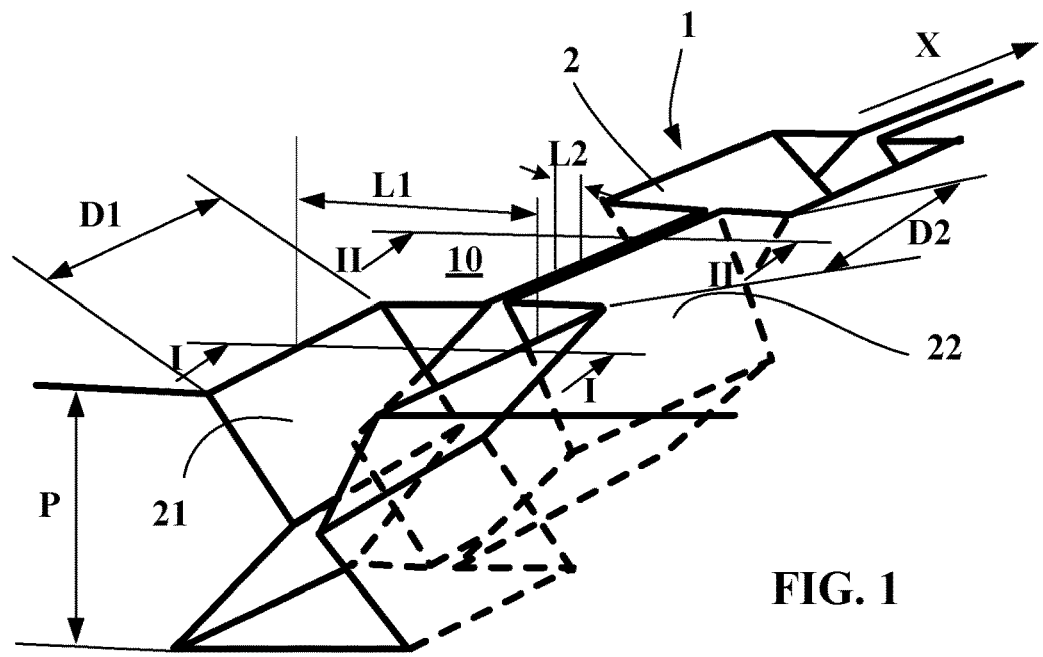
FIG. 1
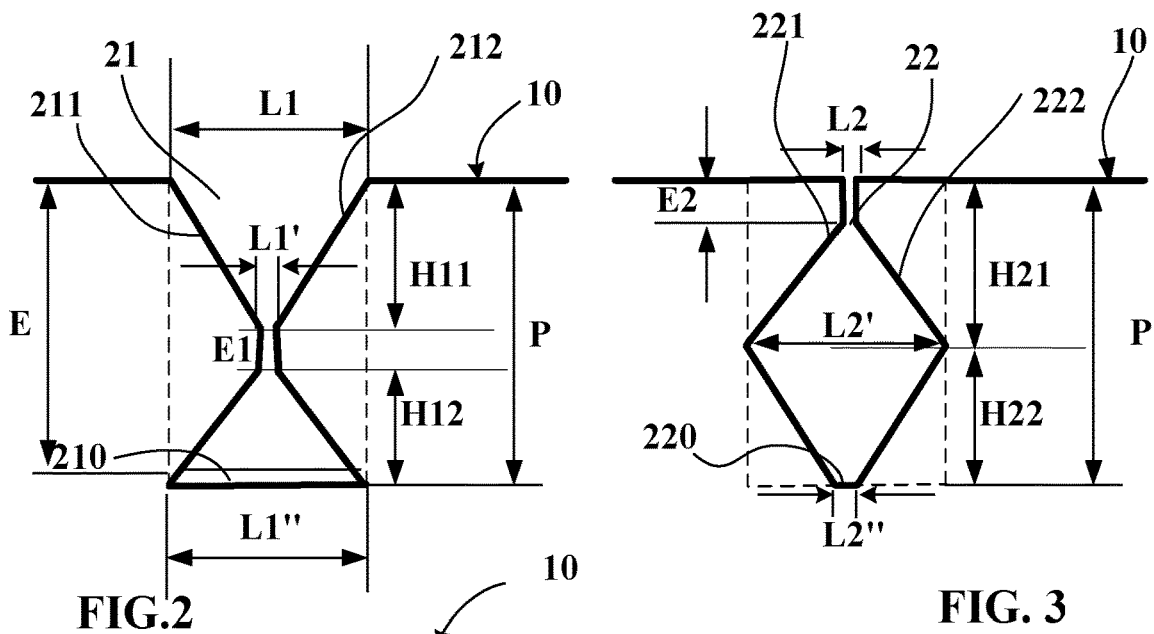
FIG. 2
FIG. 3
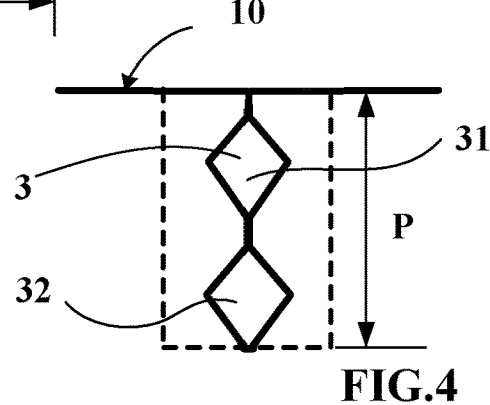
FIG. 4

TIRE TREAD

RELATED APPLICATIONS

This is a U.S. National Phase Application under 35 USC 371 of International Application PCT/FR2017/050798 filed on Apr. 5, 2017.

This application claims the priority of French application no. 1653114 filed Apr. 8, 2016, the entire content of which is hereby incorporated by reference.

FIELD OF THE INVENTION

Background of the Invention

The invention relates to treads for tires and more particularly to the designs of the tread pattern for these treads and to the tires provided with such treads, the ability of which to drain away water present on the road surface becomes more lasting with wear, these treads also having improved wearing performance.

Prior Art

As is known, the use of tires on vehicles in wet weather running conditions requires rapid elimination of the water present in the contact patch in which the tire makes contact with the road surface in order to ensure that the material making up the tread comes into contact with this road surface and thus for it to be possible to generate traction and braking forces while controlling the path of the vehicle. The water which is not pushed ahead of the tire flows or is collected partially in the grooves formed in the tread of the tire in order to allow contact between the tire and the road surface.

The grooves form a flow network for the water which needs to be lasting, that is to say effective throughout the duration of use of a tire between its new state and its removal once its level of wear reaches the limit set by regulations.

For tires intended for the steered or load-bearing axles of a heavy-duty vehicle, it is common practice to form, in the tread of these tires, circumferential (or longitudinal) grooves, the depth of which is equal to the total thickness of the tread (this total thickness not taking into consideration the thickness that may be intended for allowing partial renewal of the grooves through an operation referred to as regrooving). Thus, a tread has a water drainage performance which is always at least equal to a minimum performance referred to as the safe performance, this being true regardless of the level of wear of this tread.

For prior art tires, the total voids volume when new is, as a general rule, around at least 10% and at most equal to 35% of the total volume of the tread intended to be worn away during running. The voids volume comprises, when new, the volume of all the grooves, sipes and cavities formed in the tread; the total volume of the tread corresponds to the volume of material measured down to the bottom of the innermost cavities of the tread, to which the total voids volume is added.

It is found that the prior art tires have an available voids volume in the contact patch which is relatively high in the new state; the available voids volume means that this volume can be partially or completely filled with the water present on the roadway notably in wet weather. The voids volume opening onto the tread surface in the contact patch is evaluated when the tire is subjected to its standard static compression and inflation conditions as notably defined for Europe by the E.T.R.T.O. standard.

While grooves or, more generally, cavities are essential to draining away water in the contact patch in contact with a road surface, the resulting reduction in material on the tread may appreciably affect the wearing performance of this tread and consequently reduce the duration for which the tire can be used that results notably from of an increase in the rate of wear of said tread. Other tire performance aspects may also be affected, such as the handling performance, road noise performance, or rolling resistance.

It is also found that these grooves, formed so as to have a working depth equal to the tread height to be worn away, may be the cause of endurance problems. Under certain running conditions, objects such as stones may be trapped in these grooves and attack the bottom of these grooves, causing breaks to appear in the material forming the tread. These breaks may result in water infiltrating into the tread as far as the reinforcements.

Creating a plurality of grooves on a tread therefore has the drawback of reducing the quantity of tread material for a given width of tread and therefore of reducing the service life of the tire as a result of an excessively high wear rate.

Moreover, the grooves reduce the compression and shear stiffnesses because these grooves delimit portions of material which are sensitive to deformation compared with the parts delimited by sipes. Specifically, in the case of a sipe, the walls of material delimiting this sipe can come into contact with one another at least in part in the contact patch in contact with the road surface. This reduction in stiffness, in the case of the presence of grooves, leads to an increase in deformation and generates a reduction in the wearing performance of the tread: more pronounced wear is observed for a set distance covered (which corresponds to an increase in the rate of wear of the tread). Furthermore, an increase in rolling resistance and therefore in fuel consumption of vehicles equipped with such tires is observed as a result of an increase in the hysteresis losses associated with the cycles of deformation of the material of which the tread is made.

In order to limit the drop in stiffness associated with the presence of the grooves required by the need to drain water, a solution described in the patent publication EP 206227 has been proposed, according to which a groove comprising open parts linked together by sipes that terminate in the depthwise direction in channels that ensure continuity of circulation of the fluids is formed.

Also known is the document WO 2011/039194, which proposes a tire tread having a thickness of material to be worn away, this tread being provided with a plurality of undulating grooves that open in a discontinuous manner on the tread surface when new and have an undulating geometry in the direction of the thickness of the tread. Each undulating groove is discontinuous at the surface but continuous when new within the tread so as to allow fluid to flow. This undulating groove is formed in the tread by a succession of external cavities that open onto the tread surface when new and are linked to plurality of internal cavities, the latter being positioned radially and entirely inside the tread surface when new between the external cavities. The internal cavities may be designed to lie at different depths within the tread.

Moreover, the continuity of the flow of water in each undulating groove when new is ensured by a continuity of passage between the external cavities and internal cavities. This continuity is realized by linking cavities that connect the external cavities and internal cavities. By virtue of the presence of these linking cavities, it is possible to ensure circulation of the water from an external cavity to an internal cavity and thus to obtain better drainage of the water.

In order to make it easier to mould and demould this type of undulating groove, combining each undulating groove with sipes that continue the internal cavities as far as the tread surface when new has been considered.

By virtue of this tread structure, a voids volume that is appropriate and reduced compared with that of the usual grooves while at the same time achieving satisfactory drainage when new is obtained. This type of groove makes it possible to limit the reduction in stiffness of the tread when new.

While this type of groove performs well when new and down to partial wear corresponding to the disappearance of the external cavities, it is clear that when the internal cavities open onto the tread surface, these cavities are no longer linked together and it is necessary to provide an additional flow network for example by forming cavities under the tread surface in the new state that are converted into continuous grooves following partial wear. This additional network has the consequence of reducing the stiffness.

The document EP1341679 B1 shows a tread comprising a groove formed by a succession of wide parts and narrow parts of the sipe type. This succession lies both in the main direction of the groove and in the direction of the depth. In this example, there is no continuity of wide groove volumes; therefore, in order to ensure a flow performance necessary for good drainage, it is necessary to supplement the design of this tread with additional channels which only become active when they open onto the tread surface.

Therefore, there is a need to maintain effective drainage regardless of the level of wear while reducing the voids volume to the bare minimum required without impairing the wearing performance either in terms of wear rate or in terms of regularity of wear. This is one object of the present invention.

Definitions

An equatorial mid-plane is a plane perpendicular to the axis of rotation and passing through the points of the tire that are radially farthest from said axis.

In the present document, a radial direction means a direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centred on the axis of rotation. This direction is perpendicular both to the axial direction and to a radial direction.

A tread has a maximum thickness E of material to be worn away during running, this maximum thickness being less than the depth of the deepest grooves in order to maintain sufficient drainage even when the tread reaches its maximum level of wear.

The usual running conditions of the tire or use conditions are those which are defined by the E.T.R.T.O. standard for running in Europe; these use conditions specify the reference inflation pressure corresponding to the load-bearing capacity of the tire as indicated by its load index and speed rating. These use conditions can also be referred to as "nominal conditions" or "working conditions".

A cut generically denotes either a groove or a sipe and corresponds to the space delimited by walls of material that face one another and are at a non-zero distance (referred to as the "width of the cut") from one another. It is precisely this distance that distinguishes a sipe from a groove; in the case of a sipe, this distance is appropriate for allowing the opposing walls that delimit said sipe to come into at least partial contact at least when in the contact patch in contact with the road surface. In the case of a groove, the walls of this groove cannot come into contact with one another under the usual running conditions as defined for example by the E.T.R.T.O.

The cuts create a total voids volume in the tread when new; the ratio between this total voids volume and the total volume of the tread including the voids volume corresponds to what is known as the voids volume ratio. The ratio between the surface area of voids opening onto the tread surface in a given state of wear and the total surface area corresponds to a surface voids ratio.

A groove is said to be continuous when it opens onto the tread surface when new, specifically along its entire extent in its main direction.

A groove is said to be discontinuous at the surface when it is formed from a succession of parts that open onto the tread surface when new, these parts being separate from one another in the main direction of this groove (that is to say in the direction of main flow in the groove).

The mean surface of a continuous or discontinuous groove is defined as being a virtual surface that divides this groove, in the main direction of this groove, into two parts which are equal or substantially equal in terms of volume.

The main direction of a groove corresponds to the direction of a flow of water in the groove when running on a road surface covered with water.

BRIEF DESCRIPTION OF THE INVENTION

One object of the present invention is to obtain good running performance in wet weather while providing a tread pattern design that is improved in terms of wear and more particularly that reduces the risks of irregular wear.

To this end, one aspect of the invention is directed to a tire tread comprising a tread surface intended to come into contact with a road surface during running, this tread having a thickness E corresponding to the thickness of material to be worn away. This tread comprises at least one groove that opens onto the tread surface of the tread in the new state, this groove having a maximum depth P and a maximum width L1 at the tread surface when new, this groove comprising a plurality of first and second portions of groove.

Each first portion of groove is delimited by facing walls spaced apart by a maximum width L1 measured at the tread surface when new, these walls approaching one another such that, at an intermediate depth H11 between 20 and 80% of the maximum depth P of the groove, they are spaced apart by a minimum width L1' less than the maximum width L1, this minimum width L1' being appropriate for the facing walls to come into contact when in the contact patch in contact with the road surface. These same walls diverge from one another down to the depth P of the groove such that they are spaced apart from one another by a groove-bottom width L1".

Each second portion of groove is delimited by facing walls spaced apart by a minimum width L2 measured at the tread surface when new, these walls diverging from one another such that, at an intermediate depth H21 between 20 and 80% of the maximum depth P of the groove, they are spaced apart from one another by a maximum width L2' greater than the minimum width L2, the minimum width L2 being appropriate for the facing walls to come into contact when in the contact patch in contact with the road surface at least when new. These same walls of the second portion of groove then approach one another down to the maximum depth P of the groove such that they are spaced apart by a groove-bottom width L2".

This groove is formed by a plurality of first and second portions of groove that are disposed in alternation and continuously one after another so as to form a continuous passage in the main direction of the groove, specifically between all the portions in order to allow liquid to flow in the groove regardless of the level of wear.

The elementary passages are disposed radially one above the other and are separated in the depthwise direction when in the contact patch in contact with the road surface. Preferably, the intermediate heights H11, H21 are between 40 and 60% of the depth P of the groove. Even more preferably, the heights H11 and H21 are identical.

In an advantageous variant, the surface area of each elementary passage is at least equal to 25% of the cross-sectional area of a groove of depth P and constant width L1.

Advantageously, the maximum width L2' of the two portions of groove is equal to the maximum width L1 of the first portions of groove.

Advantageously, the narrow parts of each first portion of groove and second portion of groove in which the facing walls of the groove come into contact have heights, E1, E2 respectively, these heights being able to be greater than zero in order to realize sufficient mechanical support.

In this way, a useful volume for drainage is obtained, which is optimal regardless of the state of wear while increasing the quantity of material in contact with the road surface, this having the effect of increasing the wearing life with closure by point contact inside the groove.

If the length of the first portions of groove is denoted D1 and that of the second portions of groove is denoted D2, it is advantageous for these two lengths to be equal.

The maximum width L2' of the second portions of groove may be identical to or different from the maximum width L1 of the first portions of groove.

By virtue of the subject matter of the invention, the corner edge profile at the tread surface varies regularly with wear, this being favourable to the resulting wear pattern.

With such grooves, it is advantageous to construct a tread for a heavy-duty vehicle tire, the voids volume ratio of which when new is between 5% and 16%. Even more preferably, the voids volume ratio is between 7 and 12%.

In order to encourage flow without excessive pressure head losses, it is sensible to provide, between the first portions of groove and the second portions of groove, connecting regions that eliminate the geometric discontinuities that are unfavourable notably to the flow of liquid in the groove.

Further features and advantages of the invention will become apparent from the following description with reference to the appended drawings which show, by way of non-limiting examples, embodiments of the subject matter of the invention.

DETAILED DESCRIPTION OF THE FIGURES

FIG. 1 shows a three-dimensional view of a first variant of a tread having a groove according to the invention;

FIG. 2 shows a view in cross section of the tread shown in FIG. 1 on a section plane, the line of which is indicated by the line II-II;

FIG. 3 shows a view in cross section of the tread shown in FIG. 1 on a section plane, the line of which is indicated by the line III-III;

FIG. 4 shows the two elementary passages formed for drainage in the groove.

DESCRIPTION OF THE FIGURES

To make the figures easier to understand, identical reference signs have been used to denote variants of the invention where these reference signs refer to elements of the same kind, whether structurally or functionally.

FIG. 1 shows a three-dimensional view of a first variant of a tread 1 according to the invention. According to this variant, the tread 1 for a heavy-duty vehicle tire has a thickness E of material to be worn away. This thickness E corresponds to the wear limit at which it becomes necessary to replace the worn tire with a new tire or at the very least to carry out a retreading operation with a new tread.

This FIG. 1 shows a groove 2 opening onto the tread surface 10 when new by way of wide parts that constitute first portions 21 of groove and narrow parts that constitute second portions 22 of groove. The first portions of groove have a maximum width L1 at the tread surface 10 when new and a length D1, while the second portions of groove have a minimum width L2 at the same tread surface and a length D2.

The first portions 21 of groove and second portions 22 of groove are disposed in alternation with one another in the circumferential direction (corresponding to the longitudinal direction) of the tread. This circumferential direction is indicated by the arrow X in FIG. 1.

The corner edges formed at the tread surface by this groove have a plurality of segments connected together in a relatively abrupt manner, that is to say forming an angle of 90 degrees between two consecutive segments. In a variant that is not shown here, it is possible to adapt the geometries of these corner edges such that the connections are softened, notably by providing that the geometries of these connections have continuous gradients (continuous first derivatives).

As can be seen in FIG. 2, which shows a cross section through a first portion 21 of groove, each first portion 21 of groove is limited by facing walls 211, 212 that open onto the tread surface 10 when new, these walls 211, 212 being spaced apart by a maximum width L1 at this tread surface when new. These walls 211, 212 then gradually approach one another into the depth of the tread.

Starting at an intermediate depth H11, which is equal in the example described to 50% of the depth P of the groove and at a height E1, the facing walls 211, 212 are spaced apart from one another by a small spacing L1' appropriate for these walls to come into contact with one another over this height E1 when in the contact patch in contact with the road.

Next, the walls of the first portions of groove diverge from one another such that, at the bottom 210 of the groove 2, they are at a spacing L1" equal, in the present case, to the width L1 measured at the tread surface 10 when new.

As far as the second portions 22 of groove are concerned, and as can be seen in FIG. 3, which shows a cross section on a plane, the line of which is indicated by the line III-III in FIG. 1, the facing walls 221, 222 delimiting these second portions of groove are close enough together at the tread surface 10 when new (spacing L2) to come into contact with one another when in the contact patch in contact with the road. Next, these walls 221, 222 diverge gradually from one another so as to be at a maximum spacing L2' at a depth H21, this latter depth being, in the present case, equal to 50% of the depth P of the groove 2.

In the remaining depth H22, the two walls 221, 222 delimiting the second portions 22 of groove gradually approach one another so as to be at a spacing L2" at the depth P, that is to say at the bottom 220.

Thus, it has been possible to form at the same time voids with volumes limited to the bare minimum necessary and stiffening the tread by the presence of mechanical bridging in the contact zones between the facing walls. Furthermore, an appropriate surface voids ratio is maintained, regardless of the level of wear of the tread.

Furthermore, and as can be seen clearly in FIG. 4, which shows the two preceding cross sections in superposition, a continuous passage 3 is obtained between the different portions of groove, this passage 3 allowing flow without any discontinuity between the first and second portions of groove, regardless of the level of wear of the tread.

This continuous passage 3 is formed by two elementary passages 31, 32 that are continuous in the main direction of the groove 2 and disjointed in the direction of its depth. The cross-sectional area of each elementary passage 31, 32 is in this case substantially equal to 20% of the total surface area of a groove of depth P and constant width equal to the maximum width L1 of the first portions of groove (this groove is shown schematically in FIGS. 2 to 4 by way of dotted lines). It is clearly apparent that the voids volume has been greatly reduced while maintaining appropriate drainage, regardless of the level of wear, by virtue of this groove geometry.

In the example shown and described, the walls of the first and second portions of groove are formed with flat faces, but these same walls could, of course, be formed with curved faces, satisfying the same design constraints in order to achieve the same result, namely the formation of two elementary drainage passages, one being situated between the tread surface when new and around halfway through the depth P of the groove, the other being situated in the part between halfway through the depth and the bottom of the groove.

In the example shown and described, each first portion of groove and each second portion of groove has a constant cross section. It is of course conceivable for each portion of groove to have a variable geometry in the main direction of flow of the groove, this variable geometry being combined with the definition rules given for said groove.

In another variant, the first and second portions of groove have an identical width at the surface when new but have regions of contact at different depths so as to create at least two passages for drainage.

In the example shown for the understanding of the invention, the connections between portions of groove are made in an abrupt manner. Of course, it is possible for these connections to be realized such that there is a continuity of gradients measured on the level curves. A level curve is understood to be a corner edge formed by the groove at a tread surface in a state of wear of the tread. It has been shown that the first portions are of constant cross section, as is also the case for the second portions of groove. In order to reduce the hydrodynamic pressure head losses, it is advantageous to provide, between each first portion of groove and each second portion of groove, an intermediate region that provides a connection limiting the geometric discontinuities.

The invention also relates to a tire provided with a tread as described and even more particularly to a tread intended to be fitted to a heavy-duty vehicle.

Of course, the invention is not limited to the examples described and shown and various modifications can be made thereto without departing from the scope as defined in the claims.

The invention claimed is:

1. A tire tread comprising:
a tread surface configured to come into contact with a road surface during running, the tread having a thickness corresponding to a thickness of material to be worn away; and
at least one circumferential groove that opens onto the tread surface of the tread having a maximum depth at the tread surface when new, said groove comprising:
a plurality of first groove portions, each first groove portion being delimited by first facing walls spaced apart by a first maximum width measured at the tread surface when new, the first facing walls approaching one another such that a first intermediate depth measured from the tread surface is between 20 and 80% of the maximum depth of the at least one groove, the first walls are spaced apart by a first minimum width less than the first maximum width, the first minimum width configured for the first facing walls to come into contact when in a contact patch of the tread surface that is in contact with the road surface, the first walls diverging from one another down to the maximum depth of the at least one groove such that the first facing walls are spaced apart from one another by a first groove-bottom width; and
a plurality of second groove portions, each second groove portion being delimited by second facing walls spaced apart by a second minimum width measured at the tread surface when new, the second facing walls diverging from one another such that, a second intermediate depth measured from the tread surface is between 20% and 80% of the maximum depth, the second facing walls are spaced apart from one another by a second maximum width greater than the second minimum width, the second minimum width configured for the second facing walls to come into contact when in the contact patch of the tread surface that is in contact with the road surface at least when new, the second walls delimiting the second groove portion then approaching one another down to the maximum depth of the groove such that they are spaced apart by a second groove-bottom width,
wherein the at least one groove is formed by a plurality of said first and second groove portions that are disposed in alternation and continuously one after another to form a continuous passage to allow liquid to flow in the at least one groove regardless of a level of wear, said continuous passage being broken down into two elementary passages disposed radially one above the other,
wherein the two elementary passages, when viewed in circumferential direction appear as two continuous circumferential grooves arranged radially one above the other, a maximum width of each groove being less than the first maximum width and greater than the second minimum width.

2. The tire tread according to claim 1, wherein a surface area of respective voids formed by the walls of each elementary passage is at least equal to 25% of a cross-sectional area of a groove having a depth equal to the maximum depth and a constant width equal to the first maximum width.

3. The tire tread according to claim 1, wherein at least one of:
   a first intermediate height, measured from first groove-bottom width to the first minimum width is between 40 and 60% of the maximum depth, and
   a second intermediate height, measured from second groove-bottom width to the second maximum width is between 40 and 60% of the maximum depth.

4. The tire tread according to claim 1, wherein the parts of each said first portion of groove and each said second portion of groove in which the facing walls of the groove come into contact have heights, respectively, said heights being greater than zero in order to realize appropriate mechanical support.

5. The tire tread according to claim 1, wherein the first groove portion and the portion second are joined together by connecting regions configured to eliminate geometric discontinuities between the first and second groove portions.

6. The tire tread according to claim 1, wherein a voids volume ratio when new is between 5% and 16%.

7. The tire according to claim 1, wherein the tire is a tire for a heavy-duty vehicle.

8. The tire tread according to claim 1, wherein from a radially inner position to the tread surface:
   the first facing walls approach each other with first constant but opposite slopes, and then the first facing walls diverge from each other with second constant but opposite slopes, and
   the second facing walls diverge from each other with third constant but opposite slopes, and then the second facing walls approach each other with fourth constant but opposite slopes.

9. The tire tread according to claim 1, wherein the first maximum width is substantially equal to the first groove-bottom width.

10. The tire tread according to claim 1, wherein the second minimum width is substantially equal to the first minimum width.

* * * * *